UNITED STATES PATENT OFFICE.

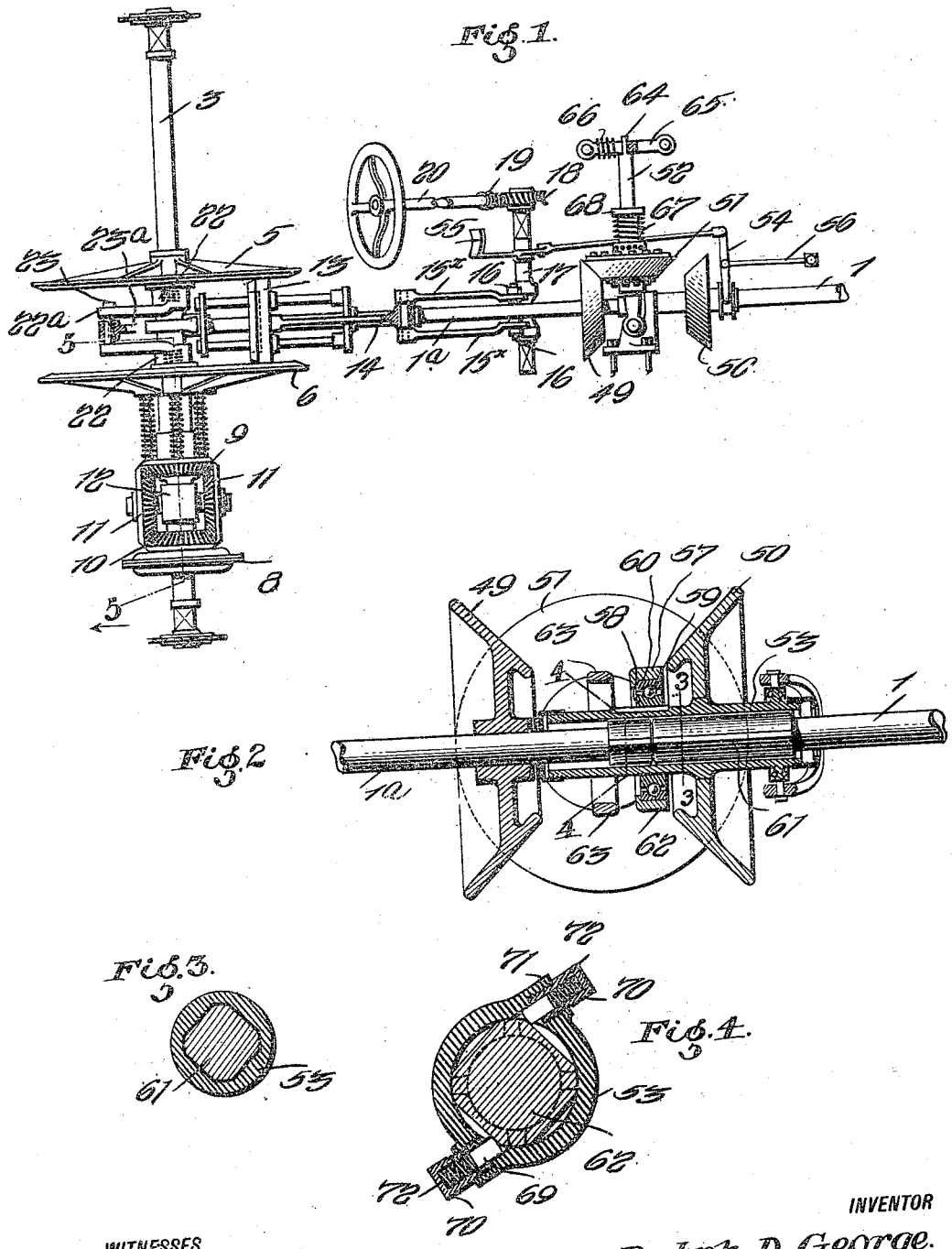

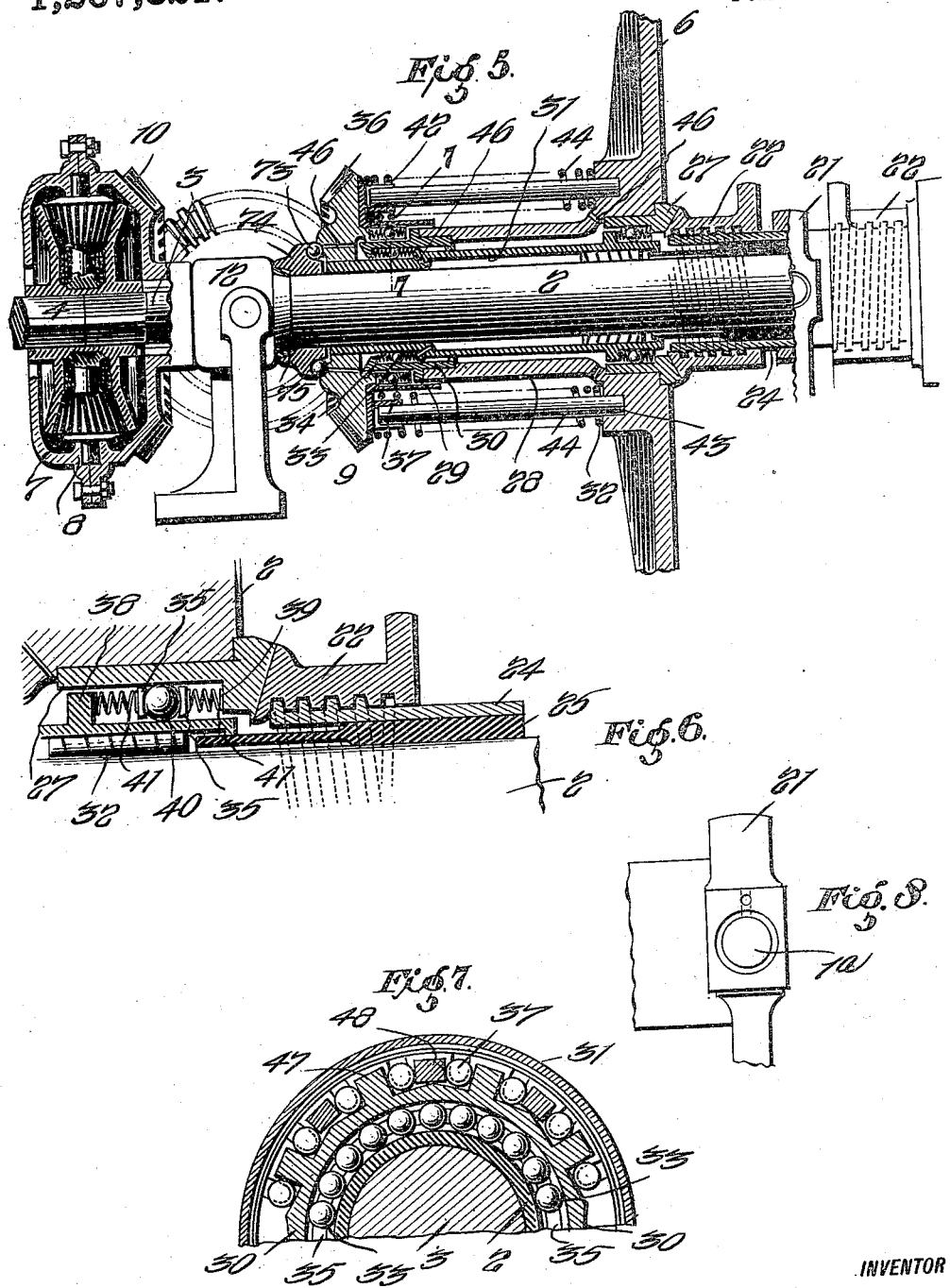

RALPH DOUGLASS GEORGE, OF KANSAS CITY, MISSOURI.

TRANSMISSION MECHANISM.

1,267,321.  Specification of Letters Patent.  Patented May 21, 1918.

Application filed June 13, 1917. Serial No. 174,499.

*To all whom it may concern:*

Be it known that I, RALPH D. GEORGE, a citizen of the United States, and a resident of Kansas City, in the county of Jackson and State of Missouri, have invented certain new and useful Improvements in Transmission Mechanism, of which the following is a specification.

My invention is an improvement in transmission mechanism, and has for its object to provide a mechanism of the character specified, wherein a driven shaft is provided consisting of sections to each of which a disk is connected, and the sections being connected by reversing mechanism so that they may rotate in the same direction, together with a connecting wheel movable radially of the disks for connecting the same to vary the relative speed of the driven shaft.

A further object of the invention is to provide means in connection with the disks and the wheels for simultaneously moving one of the disks away from the wheel and the wheel away from the other disk.

Another object of the invention is to provide an improved form of reversing mechanism.

In the drawings:

Figure 1 is a top plan view of the gearing, with parts in section;

Fig. 2 is a section through the reversing mechanism;

Figs. 3 and 4 are sections on the lines 3—3 and 4—4, respectively, of Fig. 2;

Fig. 5 is a section on the lines 5—5 of Fig. 1, looking in the direction of the arrow adjacent the line;

Fig. 6 is an enlarged detail of Fig. 5;

Fig. 7 is a section on the line 7—7 of Fig. 5;

Fig. 8 is a top plan view of the pedestal.

In the present embodiment of the invention, the driving shaft 1—1ª is arranged perpendicular to the driven shaft. The driven shaft is sectional, consisting of sections 2, 3 and 4, the section 2 being hollow and the section 3 being journaled in the section 2. A friction disk 5 is secured to the shaft section 3, and a disk 6 is connected to the section 2 in a manner to be presently described, while a differential, indicated at 7 and mounted in a housing 8, is arranged between the sections 3 and 4, connecting the said sections.

A reversing mechanism is arranged between the disk 6 and the shaft section 3. The said mechanism comprises a bevel gear wheel 9 connected to the disk 6 in a manner to be presently described, a bevel gear wheel 10 integral with the differential casing 8, and two gear wheels 11 pivoted on the pedestal 12. It will be evident that the disks 5 and 6 will thus tend to rotate the shaft 3 in the same direction, and power may be taken from the ends of the shafts 3 and 4. A driving disk 13 is arranged between the disks 5 and 6, and is adapted to engage the adjacent faces of the disks to drive the same. This disk is mounted on the section 1ª of the driving shaft, and is adapted to be moved toward and from the centers of the disks 5 and 6, to provide for variable speed. The disk 13 is moved by means of a link 14, connected at one end to the hub of the disk, and pivoted at the other between a pair of links 15 which are connected with upstanding arms 16 on a shaft 17 suitably mounted and having a worm wheel 18 which is engaged by a worm 19 on a wheel shaft 20, and by means of the wheel on the shaft 20, the shaft 17 may be swung in either direction to move the disk 13.

The end of the shaft section 1ª adjacent to the shafts 2, 3 and 4 is supported by a pedestal 21, and mechanism is provided at this point for moving the disk 6 away from the disk 13, and for swinging the shaft section 1ª away from the disk 5, to disengage the three disks. The said mechanism comprises rings 22 in connection with the disks 5 and 6, the said rings extending inwardly toward each other. Each of these rings is internally threaded, and is engaged by a threaded sleeve 24 journaled on the shaft and extending through the pedestal. The shaft section 1ª is journaled at its end in this sleeve 24, and it will be evident that when the rings 22 are turned in the proper direction one ring 22 will push the disk 6 away from the disk 13 and the other ring 22 will push the sleeve 24 toward the disk 6, moving with it the shaft section 1ª.

Each ring has an arm 22ª, and one of these arms is provided with a pin 23 rigid therewith and extending loosely through a bearing in a rod 23ª and loosely engaging the other arm 22ª. It will be evident that when this rod 23ª is moved in either direction the rings 22 will be turned.

Bushings 25 of suitable anti-friction material are arranged between the sleeve 24 and the shaft 2. It will be noticed from an inspection of Figs. 5 and 6 that the collars 22 abut the ends of bushings 27 arranged within the hubs of the disks 5 and 6. The disk 6 has an extension hub 28, which bears at the end remote from the disk 6 against an annular rib 29 on a collar 30. This collar has one end extending into the extension hub 28 which is reamed or counterbored to receive the same, and the other end extends into an annular recess at the center of the bevel gear wheel 9.

A sleeve 31 encircles the shaft 2, and the said sleeve has one end received within the bevel gear 6 and secured thereto, and the other end of the sleeve is enlarged to fit the shaft 2 loosely. Spiral roller bearings 32 are arranged between the enlarged end of the sleeve and the shaft 2, and at the junction of the enlarged portion with the body of the sleeve an annular external shoulder is formed, which faces a shoulder at the end of the collar 30 adjacent to the bevel gear wheel 9. A ball bearing 33 is arranged between these shoulders and between the ring 30 and the sleeve 31, and it will be noted that the said shoulders are spaced apart a considerable distance from each other, and that the ball bearing is midway between the shoulders. The balls are held in proper position by means of coil springs 34 arranged on opposite sides of the balls and bearing against the shoulders, and at the balls the springs engage retainers 35. An angle ring 36 is connected to the bevel gear 9 at the face adjacent to the disk 6, and the cylindrical portion of this ring extends out over the extension hub 28 of the gear 6.

A ball bearing 37 is arranged between the cylindrical portion of the ring and the collar 30, and the said ball bearing 37 is mounted in a manner to be later described. A third ball bearing is arranged between the bushings 27 and the adjacent end of the sleeve 31. The sleeve has an annular rib 38 facing an annular shoulder 39 in the bushing, and the ball bearing 40 is arranged between these shoulders. Springs 41 are arranged on each side of the ball bearing, engaging at one end retainers 35 at the balls, and at the other end engaging the rib 38 and shoulder 39. That portion of the annular ring 36 which is perpendicular to the shaft 2 has a series of sockets 42, each of which is open at its outer side. The hub of the disk 6 has openings 43 registering with these sockets, and each socket and its registering opening is designed to receive a pin 44, each pin having one end received in a socket and the other in an opening 43.

Coil springs 44 encircle the pins and act normally to press the disk away from the bevel gear. When the disk 6 is moved away from the disk 13 the springs are compressed, and it will be noticed that the pins are free enough to permit this relative movement.

The springs in connection with the ball bearings 33, 37 and 40 are also compressed, but the balls are held in their proper position, and all the springs tend to return the parts to original position.

It will be noticed from an inspection of Fig. 5 that oil holes 46 are provided in the bevel gear 9, in the hub 28 and in the sleeve 31 for permitting oil to pass.

The ball bearing 37 is shown more particularly in Fig. 7. The collar 30 has radial lugs 47 spaced apart from each other at regular intervals, and that portion of the collar between the lugs is beveled in opposite directions toward the lugs, so that the central portion of the periphery of the collar is highest, gradually sloping toward each lug. The balls 37 rest against the lugs 47, and a tooth 48 extends between the pair of balls which are between each pair of lugs 47. These teeth 48 are on the gear wheel 36, and since the collar is rigid with the hub 28 of the disk 6 it will be evident that while the gear wheel and disk may move toward and from each other they must rotate together. The balls 37, however, take up the friction in the to and fro movement. When the disks 5 and 6 are rotated, they will move in opposite directions and the shaft 2 will be rotated in the opposite direction to the bevel gear wheel 9. Through the reversing gear mechanism 9—10—11, however, the shaft 3 will rotate in the same direction as the shaft 4, while the differentials 7 will permit them to move relatively to each other to compensate for turning and the like.

The reversing mechanism is shown in Figs. 1 to 4. This mechanism comprises cone wheels 49, 50 and 51, the first named being secured to the shaft section 1ª, the second named being mounted to slide on the section 1, while the third named is journaled on a shaft 52, to be later described.

The wheel 50 has an elongated hub 53 and the end of the hub remote from the conical wheel 49 has rotatably connected therewith one end of a lever 54. The other end of the lever is connected with a treadle 55 journaled on the shaft 17, and the lever 54 is pivoted intermediate its ends to a fixed support 56. It will be evident that when the treadle is operated the cone wheel 50 will be moved toward and from the wheel 49. The hub 53 is mounted to slide and to rotate in a bearing pedestal 57, and the sleeve is feathered to a ring 58, and a ball bearing 59 is arranged between the ring 58 and a bushing 60 in the pedestal. While the hub may be moved longitudinally with respect to the pedestal, the ring must rotate with the sleeve.

The hub 53 has a portion of its bore cylindrical, as indicated in Fig. 4, and another portion polygonal, as indicated in Fig. 3, the said portion being approximately square in the present instance but having its corners beveled. Each of the shaft sections 1 and 1ª has portions 61 and 62, respectively, which fit the polygonal portions of the shaft to constrain the sleeve and the shaft sections to rotate together. The cylindrical portion of the bore of the hub is circumscribed about the polygonal portions of the shafts, so that when the said polygonal portions are in the cylindrical portions of the bore they may rotate freely in the said cylindrical portions. The corners of the enlarged portions of the shaft are beveled, as shown, for a purpose to be presently described, and while the polygonal portion 61 of the shaft section 1 is always in the polygonal portion of the bore, the enlarged portion 62 of the shaft section 1ª may be moved from the polygonal portion of the bore to the cylindrical portion, when the hub is moved longitudinally of the shaft section.

The shaft 52 is forked at its inner end and the arms 63 of the fork extend on opposite sides of the hub 53 and are pivoted to the pedestal, as shown in Fig. 1. The outer end of the shaft has a reduced lug 64 which moves in a slot extending longitudinally of a fixed bar 65. A coil spring 66 encircles the bar 65 and normally presses the end of the shaft toward the cone wheel 50. A coil spring 67 is arranged on the shaft 52, between the cone wheel 51 and a stop 68 on the shaft, and this spring acts to force the cone wheel toward the wheels 49 and 50, the shaft 52 having a stop for limiting the said motion of the wheel. The wheel 51 is of fiber, while the wheels 49 and 50 may be of cast iron or other suitable metal.

In operation, when it is desired to reverse the transmission, the treadle is operated to move the cone wheel 50 toward the wheels 49 and 51. As the hub 53 moves toward the wheel 49 the enlarged portion 62 of the shaft section 1ª moves out of the polygonal portion of the hub and into the cylindrical portion, so that the shaft section 1ª may rotate freely with respect to the hub 53 and with respect to the shaft section 1ª. The shaft section 1ª now rotates in the reverse direction to the shaft section 1, which is the driving shaft, the rotation being through the cone wheel 51. In order to connect the parts in the direct motion, the wheel 50 is moved away from the wheels 49 and 51. Just before the enlarged portion 62 of the section 1ª moves into the polygonal portion of the bore of the hub, it reaches the point shown in Fig. 4. At this point plugs or pins 69 are mounted to move approximately tangentially toward and from the shaft sections. These plugs or pins are mounted in cup shaped casings 70 which are threaded into nipples 71 in the hub, and they are spring pressed toward the shaft by coil springs 72. As the enlarged portion of the shaft section comes into engagement with these plugs, the plugs will be driven outwardly by their engagement with the shaft, but they will impart some rotation to the shaft, eventually causing the shaft to rotate at the same speed as the shaft section 1, after which, further movement of the wheel 50 and hub will connect the parts directly, the enlargement 62 moving into the polygonal portion of the sleeve. The spring 66 acts normally to brace the fiber wheels 51.

A ball bearing 73 is arranged between the gear wheel 9 and a thrust collar 74 mounted on the shaft 2. This thrust collar is held from movement away from the gear wheel by a key ring 75. This ring is conical, and engages a similarly shaped groove in the thrust collar and a shoulder on the shaft.

I claim:

1. A transmission mechanism comprising a driven shaft composed of three sections, one of the sections being hollow and another section being journaled therein, a reversing gear connecting the hollow shaft to the said other section, a differential connecting said other section to the third section, a friction disk mounted on each of the first named sections, a connecting wheel between the disks, a transmission shaft on which the wheel is movable radially of the disks, means for moving the said wheel, means for simultaneously moving one disk away from the wheel and the wheel away from the other disk, a driving shaft in alinement with the transmission shaft, and means for connecting the said shafts directly to rotate together or indirectly to rotate in opposite directions.

2. A transmission mechanism comprising a driven shaft composed of three sections, one of the sections being hollow and the other section being journaled therein, a reversing gear connecting the hollow shaft to the said other section, a differential connecting said other section to the third section, a friction disk mounted on each of the first named sections, a connecting wheel between the disks, a transmission shaft on which the wheel is movable radially of the disks, means for moving the said wheel, a driving shaft in alinement with the transmission shaft, and means for connecting the said shafts directly to rotate together or indirectly to rotate in opposite directions.

3. In a transmission mechanism, the combination with the alined driving and transmission shafts, of a friction wheel secured to the transmission shaft, a second wheel arranged at right angles thereto and contacting therewith, a third wheel having a hub provided with a polygonal bore and having a cylindrical portion at that end of the bore adjacent to the transmission shaft, said shafts having polygonal portions fitting the polygonal bore and the polygonal portion of the transmission shaft being adapted to rotate freely in the cylindrical portion when the hub is moved to bring the wheel out of contact with the second named wheel, and means for moving the hub, a shaft on which the second named wheel is journaled, and a spring normally pressing the wheel toward the first named wheel.

4. In a transmission mechanism, the combination with the alined driving and transmission shafts, of a friction wheel secured to the transmission shaft, a second wheel arranged at right angles thereto and contacting therewith, a third wheel having a hub provided with a polygonal bore and having a cylindrical portion at that end of the bore adjacent to the transmission shaft, said shafts having polygonal portions fitting the polygonal bore and the polygonal portion of the transmission shaft being adapted to rotate freely in the cylindrical portion when the hub is moved to bring the wheel out of contact with the second named wheel, and means for moving the hub.

5. A transmission mechanism comprising a driven shaft composed of three sections, a reversing gear connecting the sections, a differential connecting one of the sections to a third section, a friction disk mounted on each of the first named sections, a connecting wheel between the disks, a transmission shaft on which the wheel is movable radially of the disks, means for moving the said wheel, a driving shaft in alinement with the transmission shaft, and means for connecting the said shafts directly to rotate together or indirectly to rotate in opposite directions.

RALPH DOUGLASS GEORGE.

Copies of this patent may be obtained for five cents each, by addressing the "Commissioner of Patents, Washington, D. C."